Aug. 22, 1961  O. D. JACOBSON  2,997,546
SWITCHING DEVICE

Filed Nov. 4, 1958  5 Sheets-Sheet 1

INVENTOR
O. D. JACOBSON
BY
ATTORNEY

INVENTOR
O. D. JACOBSON
BY
ATTORNEY

INVENTOR
O. D. JACOBSON
BY
ATTORNEY

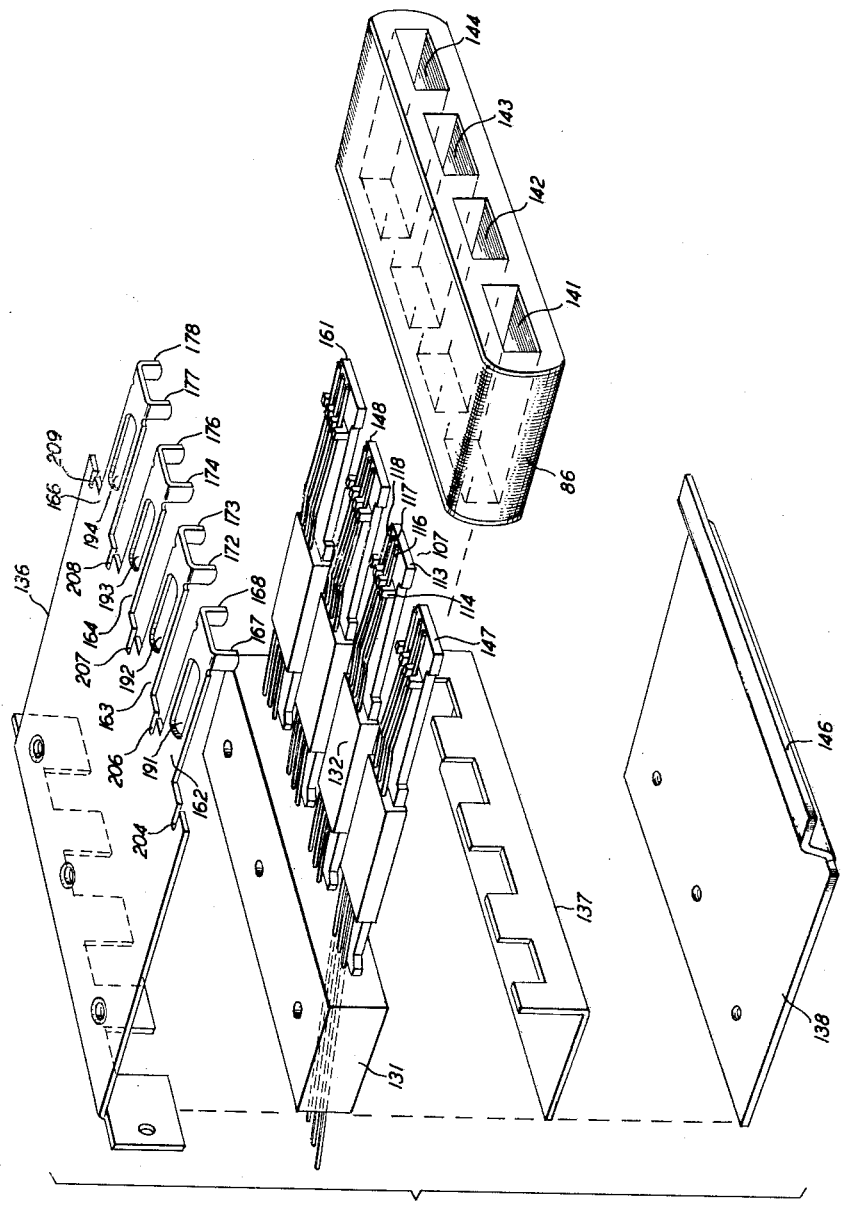
FIG. 6
INVENTOR
O. D. JACOBSON
BY
ATTORNEY

Aug. 22, 1961  O. D. JACOBSON  2,997,546
SWITCHING DEVICE

Filed Nov. 4, 1958  5 Sheets-Sheet 5

INVENTOR
O. D. JACOBSON
BY
ATTORNEY

United States Patent Office 2,997,546
Patented Aug. 22, 1961

2,997,546
SWITCHING DEVICE
Oscar D. Jacobson, Bronx, N.Y., assignor to Bell Telephone Laboratories, Incorporated, New York, N.Y., a corporation of New York
Filed Nov. 4, 1958, Ser. No. 771,822
12 Claims. (Cl. 179—27.54)

This invention relates to a switching device, and more particularly to a cross-coil switch in which the coordinate principle is utilized for controlling the establishment of connections.

An object of the invention is to improve the operation and enhance the reliability of cross-coil switches.

Another object of the invention is to simplify the construction of cross-coil switches and to improve the design thereof particularly from the standpoint of miniaturization.

A still further object of the invention is to improve the construction and operation of cross-coil switches from the standpoints of permanency of adjustment and ease of maintenance.

Switching devices of the so-called cross-coil type are known in the switching art, and usually are of the general construction in which a group of vertical, or select, coils are arranged perpendicular to, and therefore cross, a group of horizontal, or hold, coils, thereby forming at each cross-point a chamber or opening common to one vertical and one horizontal coil. A contact set is positioned in each chamber and is operated by a coordinate action, that is, by the energization of both the vertical coil and the horizontal coil which define the particular crosspoint or chamber. Such a coordinate operation is commonly utilized in telephone switching systems of the crossbar type, an application which, of course, requires extremely accurate and reliable operation.

In cross-coil switches previously known it has been found that inaccurate performance has frequently resulted from the fact that the switch would operate upon energization of only one of the coils of the crosspoint if that coil happened to be substantially over-energized due to improper functioning of some portion of the circuit.

A feature of the present invention, therefore, resides in means for positively preventing operation of a contact set unless both the vertical, or select, coil and the horizontal, or hold, coil, are first operated; that is, the contact set cannot be operated upon energization of one of the coils alone even though the coil is highly over-energized.

Another feature of the invention resides in a novel design of a common core plate which positively controls the armature travel of all the contact sets.

Still another feature resides in a novel form of switch element wherein magnetic front and back stops have iron-to-iron contact, an air gap being provided at the heel of the armature to prevent locking up of the armature.

A still further feature resides in a novel interlocking arrangement of the hold coil shields and the select coil shields.

In accordance with a specific embodiment of the invention, a suitable four sided container or casing is provided, normally open at front and back, for receiving the switch assembly. This container may be either rectangular or square depending upon the arrangement to be accommodated. The required number of elongated select coils are mounted vertically and in parallel relationship near the front of the container, while the required number of elongated hold coils are mounted horizontally and in parallel relationship just to the rear of the select coils. Each select coil is provided with a frame member which divides the interior of the coil into a number of rectangular spaces or chambers which correspond in number to the number of hold coils provided. Each hold coil, in turn, is provided with a frame which divides the interior of that coil into a number of rectangular spaces or chambers corresponding in number to the number of select coils provided. A plurality of contact sets is provided each of which comprises a set of spring wire contacts and an armature movable to operate said contacts under influence of a magnetic flux resulting from energization of the associated coils.

When the coils are assembled in the container, a plurality of pairs of coaxially aligned chambers is provided, each pair of chambers comprising one chamber of a select coil and one chamber of a hold coil. A contact set is positioned in each pair of chambers and comprises one set of contacts with its armature. A common core plate, positioned in front of the select coils, is provided with a series of rectangular apertures corresponding in number and position to the chambers in the assembled select coils. A series of multiple wire contact members are positioned in front of the core plate and are insulated therefrom, the contact wires of each switch element or contact set projecting through the respective openings of the core plate to a position where, when operated, they will engage respective sets of the multiple wires. A suitable dust cover may be provided for the front of the assembly, while the necessary lead wires for the switch elements are provided at the rear of the assembly. The cross-sectional area of one of the members included in the magnetic circuit is reduced in a novel manner whereby to insure reliable operation of the device.

A complete understanding of the arrangement contemplated by the present invention, as well as an appreciation of the various advantageous features thereof, may be gained from consideration of the following detailed description in connection with the accompanying drawings in which:

FIG. 6 is an exploded view of the horizontal level assembly of FIG. 5;

Figure 8A:
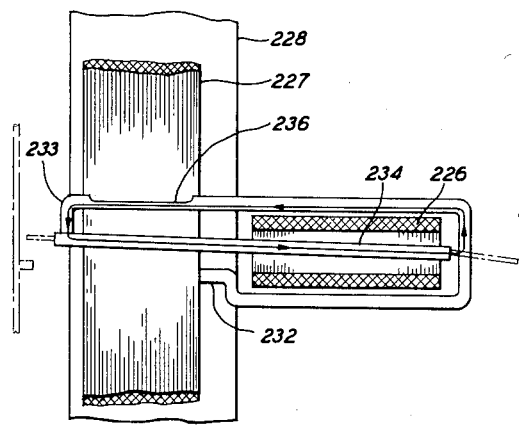

FIGS. 8A, B, C and D are schematic showings of the flux paths involved in various stages of operation of the switching device.

Referring now to the drawings, there has been selected for illustration and detailed description a "4 x 4" switch mechanism; that is, a mechanism comprising four horizontal hold coil levels and four vertical select coil files for a total of sixteen crosspoints with a crosspoint contact set located at each crosspoint. It will be obvious that this arrangement has been selected solely for illustration and that other combinations, such for example as "10 x 10," "10 x 20," "8 x 20" or the like may be provided as circumstances dictate.

A suitable casing 21 is provided within which are positioned four horizontal hold coil levels and four vertical select coil files. A multiple wire assembly is mounted near the front of the casing which comprises five spacing bars 22, 23, 24, 26 and 27 of suitable insulating material, and multiple contact wires 28, 41, 42, 43, 44, 46, 47, 48, 51, 52, 53 and 54, positioned and supported thereby. In addition to the five supporting bars referred to above, the multiple wires are supported by insulating members 56 and 57 within casing 21; the upper portion of each wire extends beyond the rear of the casing for exterior connections.

Figure 3:
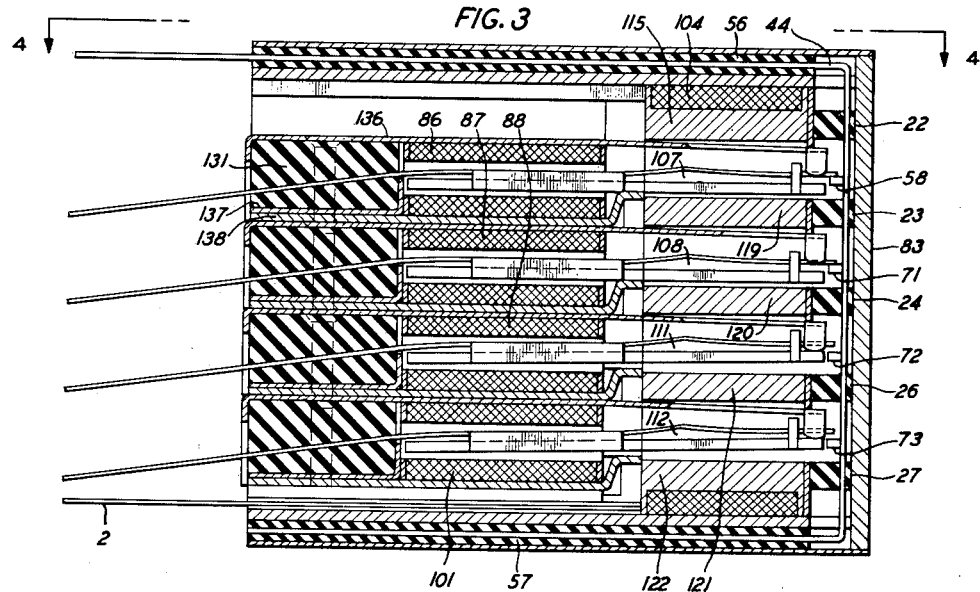
FIG. 3 is a side elevation view in section taken on line 3—3 of FIG. 1.

Each one of the multiple contact wires is provided with contact tabs properly positioned to be engaged by operated contact sets at the respective crosspoints; for example multiple wire 44 is provided with contact tabs 58, 71, 72 and 73 (FIG. 3).

Core plate 74 (FIG. 4) is mounted at the front of casing 21. This plate is punched and broached, and positions the back stops of all the armatures in a manner that will be discussed in detail subsequently. The core plate mates with the select coil shields 76, 77, 78, 81 and 82 which, in turn, position the front stops. The select coil shields and hold coil channel assemblies slip into accurately positioned, broached slots in the die cast frame of casing 21.

A dust cover 83 (FIG. 2), preferably of suitable transparent material, is removably positioned in the front of casing 21.

Figure 4:
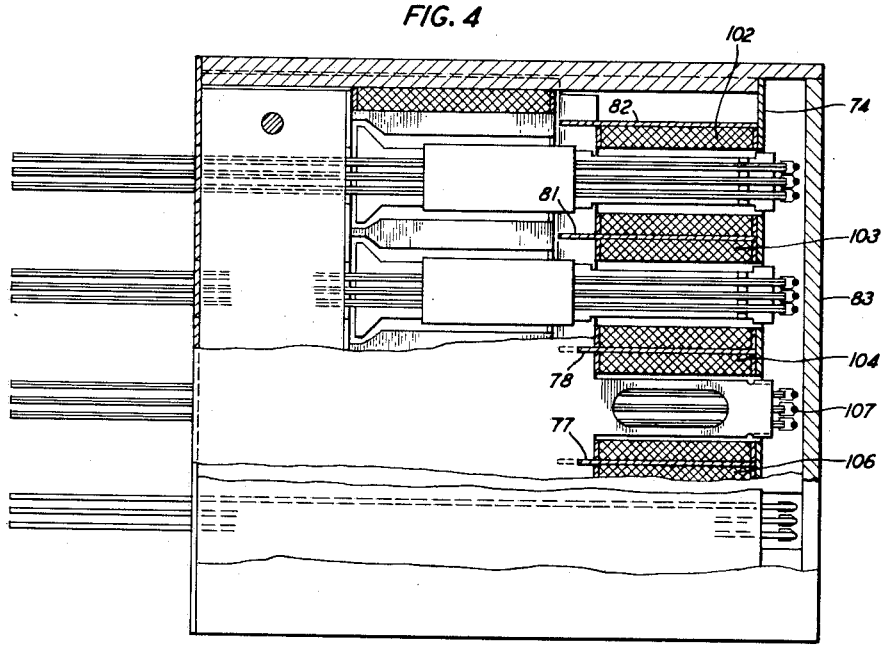
FIG. 4 is a plan view of the device of FIGS. 1 and 3 in partial section and with portions progressively broken away.

Coming now to the interior of casing 21 and referring first to FIGS. 3 and 4, four elongated, horizontal, or hold, coils 86, 87, 88 and 101, and four elongated vertical, or select coils 102, 103, 104 and 106 are positioned therein. At each crosspoint a pair of chambers in coaxial alignment is formed, one chamber of a select coil and one of a hold coil. In each of these chambers there is positioned a crosspoint contact set. For example, referring particularly to FIG. 3, four crosspoint contact sets 107, 108, 111 and 112 are located in the respective coaxial chambers formed by the abutting chambers of respective hold coils 86, 87, 88 and 101 and the chambers of select coil 104. The four chambers of select coil 104 are defined by frame crosspieces 115, 119, 120, 121 and 122 (FIG. 3) of suitable material.

Figure 1:
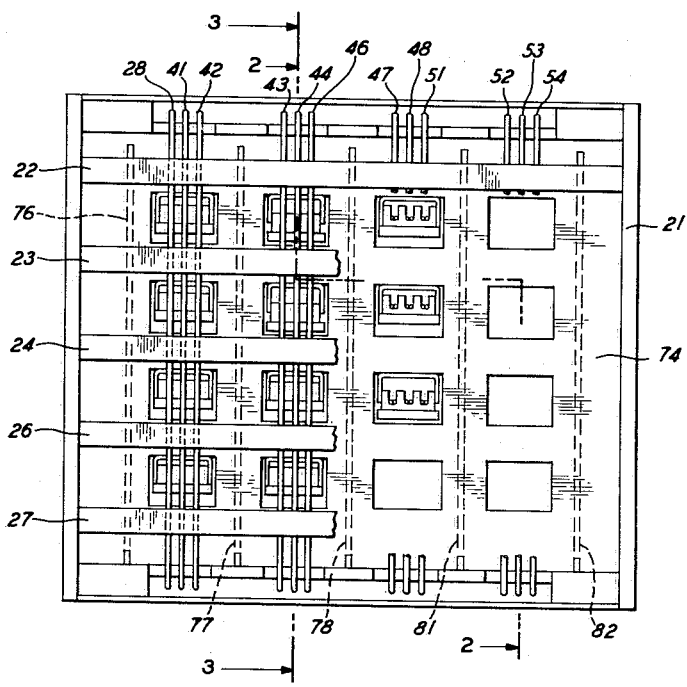
FIG. 1 is a front view of a switching device which embodies features of the present invention, a portion of the multiple being broken away to show the front core plate more clearly.
Figure 2:
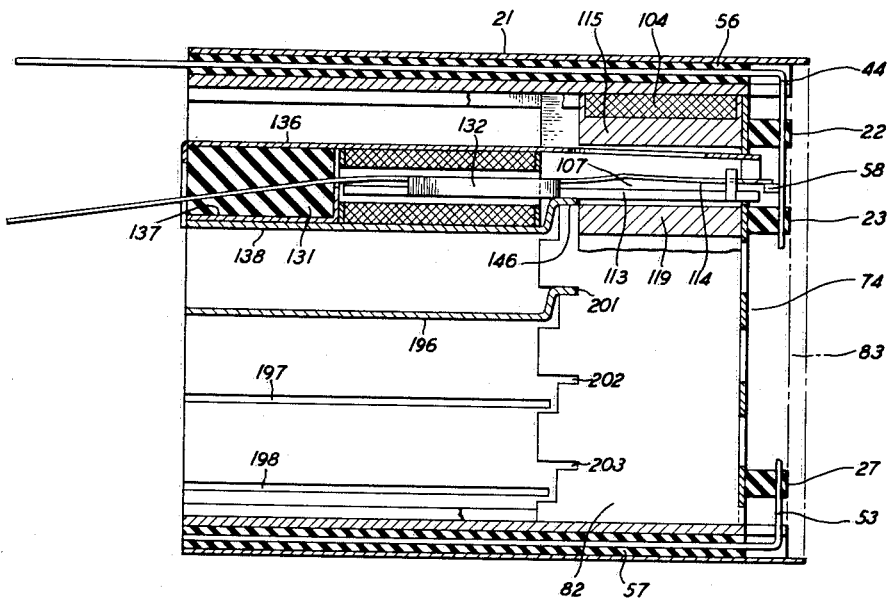
FIG. 2 is a side elevation view in section taken on line 2—2 of FIG. 1 and showing particularly the interlocking shield arrangement.

Each crosspoint contact set includes contact wires and an armature for causing the movement thereof. For example, contact set 107 (FIGS. 3, 4 and 6) includes armature 113 upon which is mounted spacing card 114. Contact wires 116, 117 and 118, each of which may be double or paired, are moved at their free end by armature 113. At the other end these wires are embedded in mounting bar 131 and therefore serve not only as contact members but also as a hinge or support for armature 113. The wires are actually attached to the armature by member 132, of suitable insulating material, there being a slight space between the rear end of armature 113 and the adjacent face of bar 131 (FIG. 2). This space prevents locking up of the armature.

Each row or level of crosspoint contact sets includes an integral hold coil shielding assembly; for example, the level shown in detail in FIG. 6 includes an upper shield plate 136, a positioning plate 137 and a lower shield plate 138. The four rectangular chambers 141, 142, 143 and 144 provided in hold coil 86 are clearly shown in this figure also.

Lower shield plate 138 is provided with an up-turned lip 146 at the front edge, which lip acts as a common front stop for the four armatures 147, 113, 148 and 161. Also, upper shield plate 136 is provided with four extension portions or arms 162, 163, 164 and 166; each of these extensions in turn is provided with two down-turned tabs, as 167, 168, 172, 173, 174, 176, 177 and 178. Each respective pair of tabs acts as the back stop for the associated armature. When plates 136, 137 and 138 are in assembled position we have, in effect, iron-to-iron contact between the front and back stops.

As shown most clearly in FIGS. 2 and 3, the extending arms are for the greater portion of their length, positioned in, and encompassed by, the chambers of respective select coils while the down-turned tab portions, or back stops, extend out of said chambers.

Figure 5:
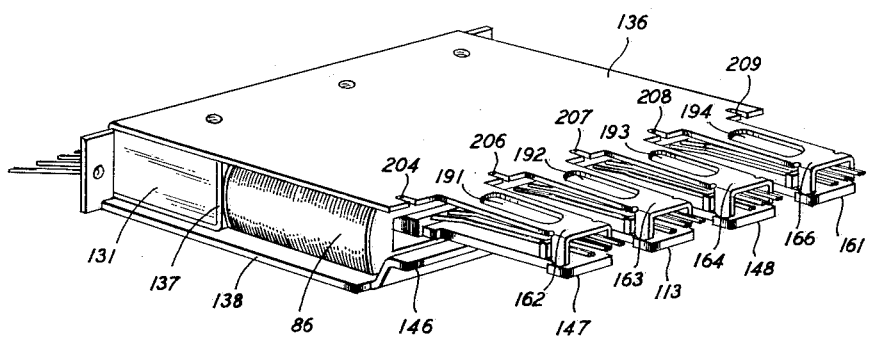
FIG. 5 is a perspective view of one horizontal level assembly including hold coil, shield members and the contact sets of the level.

A cut-out portion is provided in that part of each extension arm which is normally encompassed by a select coil whereby to reduce the cross-sectional area of that part of the arm in comparison to the back stop portion. For example, as shown in FIG. 5, such cut-out portions, designated 191, 192, 193 and 194, are provided in each extension arm of plate 136. Since the magnetic reluctance of the cut-out portions is substantially that of air, the reluctance of the over-all area of the arms is, of course, increased in comparison to that of the back stop portions and the armatures. This will cause a concentration of flux lines in the metal portions of the arm which define the cut-out portion or aperture.

As shown most clearly in FIG. 2, the lower shield plates, as 138 and 196, are positioned in slots, such as 197 and 198, provided in the side walls of casing 21, while the extended lip portions of the plates, as 146 and 201, are positioned in slots provided in the select coil shield plates, such as slots 202 and 203 provided in plate 82. Also, the upper shield plates, as 136, are provided with slots which mate with respective select coil shield plates. Plate 136, for example, is provided with slots 204, 206, 207, 208, and 209 for this purpose (FIG. 5).

It will be apparent from the preceding description that the only major portion of the magnetic circuit which is individually associated with each crosspoint is the armature. The other portions of the circuit (including the coils) are common to horizontal levels or vertical files.

Extensions of the multiple wires, crosspoint contact wires, leads for the hold coils and leads for the select coils are brought out to the rear of casing 21 to permit exterior connections.

From examination of the drawings, particularly FIG. 5, it will be apparent that each horizontal hold coil level, with its four crosspoint contact sets, forms a compact and stable unit. The novel shield plate assembly provides through the lower projecting lip 146 a positive, rigid front stop for all the armatures while the respective upper extending arms 162, 163, 164 and 166 provide positive back stops for each armature. When the structure is assembled in the casing, the extending portions pass through the aligned chambers of the select coils, and the back stop portions of each plate are then rigidly supported and positioned through their engagement with the rectangular, spaced apertures provided in core plate 74.

By virtue of various novel features provided in the assembly, including the previously described positioning of the hold coil shield plates and the select coil shield plates in accurately broached slots in the walls of the casing, the interlocking relationship of said shield plates, the provision of a rigid, common front stop for each hold coil level, and the positioning of the free end of each back stop portion of the shield coils in an accurately located aperture of the core plate, an unusually stable over-all structure is obtained in which there is virtually no possibility of the parts getting out of adjustment. Also, the resulting structure is more compact and much smaller than comparative structures of the prior art.

Referring now to FIGS. 8A to 8D there are represented in schematic form portions of a typical crosspoint contact set in order to illustrate the flux paths set up under various operate and non-operate conditions. Referring first to FIG. 8A, the condition illustrated is that wherein hold coil 226 is energized while select coil 227 is not energized. In this and the three subsequent figures, select coil shield 228 is shown schematically, as are magnetic front stop 232 and magnetic back stop 233 (both parts of the hold coil shield assembly), and armature 234. As previously described above, the upper shield plate of the hold coil shield assembly is provided with cut-out portion; cut-out portion 236 is represented in FIG. 8A.

The magnetic circuit at each crosspoint is a series opposing magnetic circuit, and in normal, unoperated condition, the armatures are biased by the support and contact wires to be held in contact with the respective back stops. With only hold coil 226 energized, as in FIG. 8A, the path of the flux is as shown by the pointed line, causing armature 234 to be attracted to back stop 233, preventing its operation.

Figure 8B:
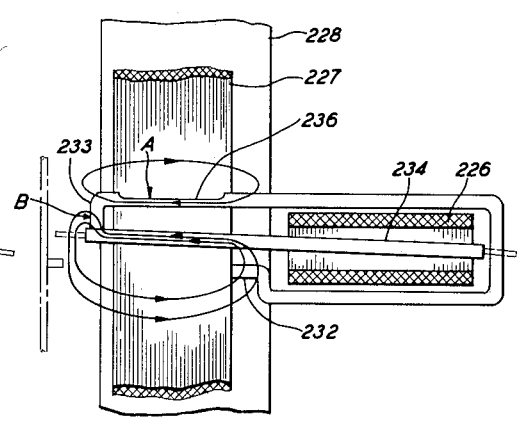

If the select coil 227 alone is energized as in FIG. 8B, armature 234 is again attracted magnetically to back stop 233 and its operation is therefore prevented for this condition also. This results from the fact that the cross-sectional area of the upper shield plate is reduced by the centrally located cut-out portion 236; the area of the magnetic plate is less therefore at point A (the cut-out portion) than at point B, the portion forming back stop 233, and the cross-sectional area of armature 234 is greater than at either points A or B. The magnetic reluctance of the cut-out portion is substantially that of air and substantially higher than that of the remaining metal arms which define the aperture. The flux lines will therefore be concentrated in the metal portions at point A causing saturation, whereas at point B, of greater cross-sectional area, the flux lines will spread out and saturation will not prevail. The flux density at B being less than that at point A, or in the armature where saturation exists, results in a flow of flux from armature 234 into the area of the back stop 233, and there is no repulsion of the armature which therefore is held in its non-operated position regardless of the degree of energization of select coil 227. The flux paths for this condition are indicated in FIG. 8B by the pointed lines and, as shown, a portion of the flux in armature 234 flows into back stop 233 before returning through select coil shield 228.

The novel arrangement of the shield plate whereby the reduced cross-sectional area at point A (FIG. 8B) results, is an important element of the structure contemplated by the invention. Operation of the armature 234 cannot result when only one of the coils, select or hold, is energized regardless of the maximum level of energization of the coil. The switch can operate only when both coils are energized above certain minimum values determined by characteristics of the device.

Figure 8C:
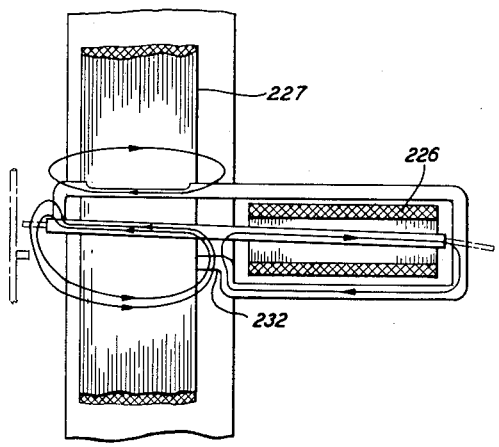
Figure 8D:
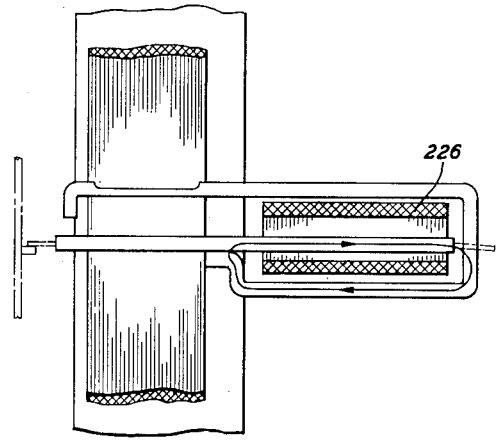

When both select coil 227 and hold coil 226 are energized the paths (flux opposing), are as indicated in FIG. 8C, and, when the coils are energized above predetermined minimum values, the armature will move to operated position in contact with front stop 232. Once the armature reaches this position, it will be held if only the hold coil 226 is energized, provided, however, that the energization is above a predetermined level. The flux path for this condition is indicated by the pointed line in FIG. 8D. The minimum values for operate and hold are determined by characteristics of the device.

In operation of the switch the proper select and hold coils are energized in either order, or simultaneously, to cause operation of the associated crosspoint contact set. Thereafter, the select coil is deenergized and voltage is lowered on the hold coil, these actions again being in either order or simultaneously. The contacts will remain in operated or closed position until the voltage on the hold coil has decreased below the minimum "hold" value.

Figure 7:
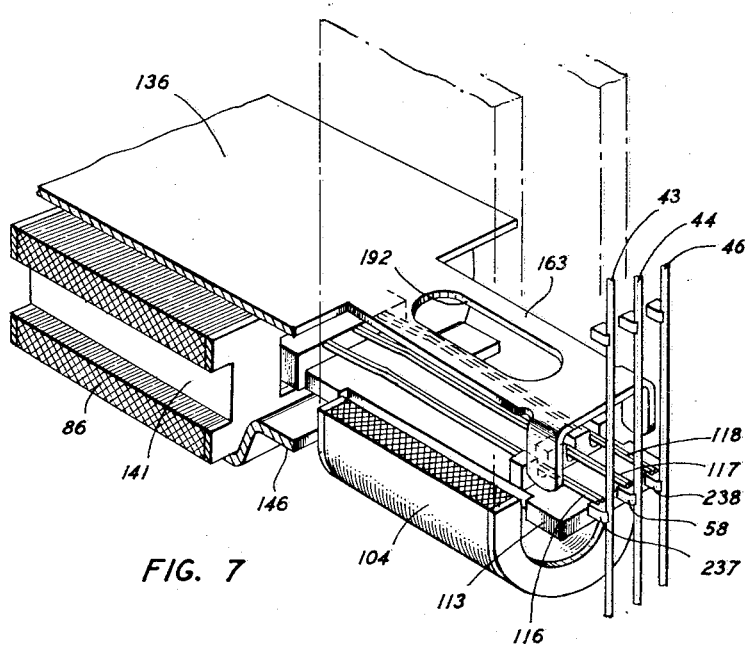
FIG. 7 is an enlarged view in partial section of a contact set.

As shown clearly in FIG. 7, operation of armature 113 causes contact wires 116, 117 and 118 to engage with contact tabs 237, 58 and 238 respectively which are provided on multiple wires 43, 44 and 46. Other contact arrangements may, of course, be provided as required by the particular application of the device.

The structure contemplated by the present invention offers important advantages from the standpoint of maintenance and reliable operation. As set forth above, the cooperative action of the core plate with the back stops, the select coil shields with the front stops and the interlocking relationship of the select coil and hold coil shields, all result in a readily established and permanently maintained adjustment of the contact positions and separations. Also, dust cover 83 may be easily removed to give ready access to the contacts for cleaning. The select coils can be reached after removal of the dust cover, front multiple and core plate. An entire hold coil assembly can be withdrawn from the casing after disconnecting the exterior wiring of the particular unit involved.

While certain specific embodiments of the invention have been selected for detailed description, the invention is not, of course, limited in its application to the embodiments described. The embodiments which have been described should be taken as illustrative rather than restrictive thereof.

What is claimed is:

1. A switching device comprising two coils adjacently positioned to form a chamber, contact members positioned within said chamber, means for selectively energizing said coils, a contact controlling armature subject to the magnetomotive force produced by the magnetic flux resulting from the energization of either of said coils, and a magnetic member included in the magnetic field of both of said coils, said magnetic member presenting areas of varying magnetic reluctance.

2. A switching device comprising two adjacently mounted coils, means for selectively energizing said coils, a contact controlling armature subject to the magnetomotive force produced by the magnetic flux resulting from the energization of either of said coils, a magnetic member included in the magnetic circuit of the switching device, and an extending arm on said member terminating in an armature stop member, said arm having an aperture therein whereby to produce an area of higher magnetic reluctance than that of the portions of the arm which define the aperture or of the stop member.

3. A switching device comprising two adjacently mounted coils, means for selectively energizing said coils, a contact controlling armature subject to the magnetomotive force produced by the magnetic flux resulting from the energization of either of said coils, and a magnetic member included in the magnetic circuit of the switching device having a part substantially enclosing one of said coils and an extending arm substantially encompassed by the other coil, an armature stop member on the extremity of said arm, the encompassed part of said arm having a portion removed therefrom whereby to reduce the cross-sectional area of the encompassed part of said arm in comparison to that of said armature stop member and said armature.

4. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including contact wires and an armature, said armatures being movable from an upper position to a lower position, and magnetic shielding means for each of said hold coils, said shielding means including an upper plate and a lower plate, said lower plate having a projecting lip thereon shaped and positioned to act as a common front stop for a group of said armatures to limit the movement thereof to said lower position, and said upper plate having a plurality of extending arms thereon, each of said extending arms acting as a back stop for one of said armatures in said group to limit the movement thereof to said upper position.

5. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including contact wires and an armature for moving said wires, said armature being movable from an upper position to a lower position, and magnetic shielding means for each of said hold coils, said shielding means including an upper plate and a lower plate, said lower plate having a projecting lip thereon shaped and positioned to act as a common front stop for a group of said armatures and said upper plate having a plurality of extending arms thereon, each of said extending arms acting as a back stop for one of said armatures in said group, each of said extending arms having a portion removed therefrom whereby to reduce the effective cross-sectional area thereof.

6. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including contact wires and an armature, said armature being movable from an upper position to a lower position, magnetic shielding means for each of said hold coils, said shielding means including an upper plate and a lower plate, said lower plate having a projecting lip thereon shaped and positioned to act as a common front stop for a group of said armatures and said upper plate having a plurality of extending arms thereon, each of said extending arms acting as a back stop for one of said armatures in said group, and a plate positioned at the front of said casing having a plurality of spaced apertures therein, each of said extending arms being positioned in a respective one of the apertures of said last-mentioned plate.

7. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including a contact wire and an armature, means for mounting said armature on said wire, means for supporting said wire near one end thereof whereby said wire acts as a support for said armature to permit movement thereof from an upper position to a lower position, and magnetic shielding means for each of said hold coils, said shielding means including an upper plate and a lower plate, said lower plate having a projecting lip thereon shaped and positioned to act as a common front stop for a group of said armatures, and said upper plate having a plurality of extending arms thereon, each of said extending arms acting as a back stop for one of said armatures in said group.

8. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including an armature, and a shield member for each of said hold coils, each hold coil shield member including an arm extending through an associated select coil and an armature back stop portion, the cross-sectional area of said extending portion being less than that of said back stop portion whereby movement of an armature away from its back stop portion is effected only when both the select and hold coils arranged thereabout are energized above given minimum values.

9. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including an armature, and a shield member for each of said hold coils, each hold coil shield member including an arm extending through an associated select coil and an armature back stop portion, said arm having a portion removed therefrom whereby to reduce the cross-sectional area thereof in comparison to that of said back stop portion.

10. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including contact wires and an armature, said armatures being movable from an upper position to a lower position, and a magnetic shield member for each of said hold coils, each of said shield members including an arm extending through an associated select coil and a back stop member for one of said armatures, the extending arm having a centrally located aperture therein wherein to increase the over-all magnetic reluctance of the arm in comparison to that of the back stop member and of said one of the armatures.

11. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contact sets including contact wires and an armature, said armatures being movable from an upper position to a lower position, and magnetic shielding means for each of said hold coils, said shielding means including an upper plate and a lower plate, said lower plate having a projecting lip thereon shaped and positioned to act as a common front stop for a group of said armatures to limit the movement thereof to said lower position, and said upper plate having a plurality of extending arms thereon, each of said arms having a pair of down-turned tabs thereon, each pair of said tabs acting as a back stop for one of said armatures in said group to limit the movement thereof to said upper position.

12. A switching device comprising a casing, a group of select coils, a group of hold coils, each of the coils in a group being positioned in said casing in parallel alignment with respect to the other coils in that group, said groups being arranged perpendicularly to each other in said casing whereby to form a plurality of chambers, each of the chambers being defined by one select coil and one hold coil, a contact set positioned in each chamber, each of said contacts sets including contact wires and an armature, said armatures being movable from an upper position to a lower position, and magnetic shielding means for each of said hold coils, said shielding means including an upper plate and a lower plate, said lower plate having a projecting lip thereon shaped and positioned to act as a common front stop for a group of said armatures to limit the movement thereof to said lower position, and said upper plate having a plurality of extending arms thereon, each of said arms having a pair of down-turned tabs thereon, each pair of said tabs acting as a back stop for one of said armatures in said group to limit the movement thereof to said upper position, each of said extending arms having a central portion removed therefrom whereby to decrease the cross-sectional area thereof in comparison to that of the respective back stop portions and of the respective armatures.

References Cited in the file of this patent

UNITED STATES PATENTS

| | | |
|---|---|---|
| 2,187,115 | Ellwood et al. | Jan. 16, 1940 |
| 2,257,900 | Crum | Oct. 7, 1941 |
| 2,264,746 | Ellwood | Dec. 2, 1941 |
| 2,326,647 | Horton | Aug. 10, 1943 |